United States Patent
Ørnbo et al.

(10) Patent No.: US 8,446,850 B2
(45) Date of Patent: May 21, 2013

(54) METHOD AND APPARATUS FOR PROVIDING BROADCAST SERVICES

(75) Inventors: Lars N. Ørnbo, Aalborg (DK); John Pedersen, Aalborg (DK)

(73) Assignee: Intellectual Ventures Holding 81 LLC, Las Vegas, NV (US)

( * ) Notice: Subject to any disclaimer, the term of this patent is extended or adjusted under 35 U.S.C. 154(b) by 929 days.

(21) Appl. No.: 12/169,556

(22) Filed: Jul. 8, 2008

(65) Prior Publication Data

US 2010/0008280 A1    Jan. 14, 2010

(51) Int. Cl.
*H04H 20/71* (2008.01)

(52) U.S. Cl.
USPC .......................................................... 370/312

(58) Field of Classification Search
None
See application file for complete search history.

(56) References Cited

U.S. PATENT DOCUMENTS

| | | | |
|---|---|---|---|
| 2003/0211855 A1 | 11/2003 | Sarkkinen et al. | |
| 2005/0233760 A1* | 10/2005 | Voltolina et al. | 455/503 |
| 2007/0019645 A1* | 1/2007 | Menon | 370/390 |
| 2008/0045224 A1* | 2/2008 | Lu et al. | 455/446 |

FOREIGN PATENT DOCUMENTS

WO    2007/107715 A2    9/2007

OTHER PUBLICATIONS

International Search Report and Written Opinion dated Oct. 14, 2009 for PCT/EP2009/057439.
European Patent Application No. 09 779 786.4-1249; Communication Pursuant to Article 94(3) EPC; Dated Jul. 5, 2011.
Third Generation Partnership Project, "Technical Specification Group Services and System Aspects; Multimedia Broadcast/Multicast Service; Stage 1 (Release 9)," 3GPP TS 22.146 V9.0.0 (Jun. 2008).
Third Generation Partnership Project, "Technical Specification Group Services and System Aspects; Multimedia Broadcast/Multicast Service (MBMS); Architecture and functional description (Release 8)," 3GPP TS 23.246 V8.2.0 (Jun. 2008).
Third Generation Partnership Project, "Technical Specification Group Services and System Aspects; Multimedia Broadcast/Multicast Service (MBMS); Protocols and codecs(Release 7)," 3GPP TS 26.346 V7.8.0 (Jun. 2008).
European Search Report, EP Application No. 09779786.4-1249, dated Jun. 29, 2012.

* cited by examiner

*Primary Examiner* — Chi Pham
*Assistant Examiner* — Kouroush Mohebbi
(74) *Attorney, Agent, or Firm* — Volpe and Koenig, P.C.

(57) ABSTRACT

A network element (for providing multimedia broadcast multicast services (MBMS) over a communication system that comprises a broadcast multicast service centre (BM-SC) wherein the network element comprises logic for allocating broadcast control plane traffic to at least one first radio network control entity dedicated to handle control plane traffic and allocating broadcast data plane traffic to at least one second radio network control entity dedicated to handle data plane traffic.

18 Claims, 7 Drawing Sheets

METHOD AND APPARATUS FOR PROVIDING BROADCAST SERVICES

FIELD

The field of the invention generally relates to a method and apparatus for providing broadcast services, such as multimedia broadcasting multicasting services.

BACKGROUND

The demand for multimedia services that can be received via mobile phones and other handheld devices is set to grow rapidly over the next few years. As a consequence of the services that are desired by the end-users, multimedia services use high bandwidths. The most cost-effective way of providing such services is in a form of broadcast transmissions, rather than unicast (i.e. point-to-point) transmissions. Typically, tens of channels carrying news, movies, sports, etc. and are broadcast simultaneously over a network, to potentially thousands of handheld devices.

Technologies for delivering multimedia broadcast services over cellular systems, such as the Mobile Broadcast and Multicast Service (MBMS) have been developed. MBMS is a broadcasting and multicasting service offered over mobile telecommunications networks, such as General Packet Radio System (GPRS) networks, Universal Mobile Telecommunication System (UMTS) networks, Evolved Packet System (EPS), and the like. The technical specifications for MBMS include 3GPP TS 22.146, 3GPP TS 23.246 and 3GPP TS 26.346.

Some cellular networks are arranged to deliver only broadcast services. In such a system, each individual cell (supported by a Node B) forms part of a cluster of cells, a cluster either defining a subset of the cells of the network or, in some instances, the cluster will define all of the cells of the network. Broadcast services are transmitted simultaneously using identical physical resources by all cells of a cluster, thereby allowing mobile stations/user equipment to combine signals received from more than one cell. Broadcast services may be transmitted by more than one cluster, in which case all cells of the plurality of clusters involved will use identical physical resources for the broadcast.

In a 'dedicated' broadcast network, where all physical resources are used for downlink transmission-only, and therefore no uplink traffic must be handled, the known network structures, as described later with respect to FIG. 1 are somewhat inefficient.

A need therefore exists for an improved method and apparatus for providing multimedia broadcast multicast services wherein one or more of the abovementioned disadvantage(s) may be alleviated.

SUMMARY

Accordingly, embodiments of the invention seek to mitigate, alleviate or eliminate one or more of the abovementioned disadvantages, singly or in any combination.

According to a first aspect of the invention, there is provided a network element for supporting multimedia broadcast multicast services (MBMS) over a communication system that is operably coupled to a broadcast multicast service centre (BM-SC). The network element comprises logic for allocating broadcast control plane traffic to at least one first radio network control entity dedicated to handle control plane traffic and allocating broadcast data plane traffic to at least one second radio network control entity dedicated to handle data plane traffic.

According to an optional feature of the invention, the communication system may comprise a plurality of communication cell clusters, each cell cluster comprising a plurality of individual communication cells, such that control plane traffic in a respective first cluster of cells is controlled by the first radio network control entity. Thus, by controlling all cells of a cluster from the same radio network controller, the process of ensuring identical configuration of the cells may be greatly simplified.

According to an optional feature of the invention, the first radio network control logic may use a point-to-point protocol for transport of control signalling to a number of wireless base stations operably coupled to the first radio network control entity. The point-to-point protocol may be a stream control transmission protocol/Internet Protocol (SCTP/IP). This may allow for alternative and separate routing of the control plane and data plane traffic in a broadcast scenario. This may allow a more efficient use of processing resources, with lower requirements for bandwidth in the transport network.

According to an optional feature of the invention, the communication system may comprise a plurality of communication cell clusters, each cell cluster comprising a plurality of individual communication cells such that each individual broadcast service for a respective cluster of cells is supported by the at least one second network control entity. The second radio network control entity may use a multicast protocol for transport of broadcast data traffic to a number of wireless base stations operably coupled to the second radio network control entity. The multicast protocol may be an user datagram protocol/Internet protocol (UDP/IP).

According to an optional feature of the invention, the network element may allocate at least one physical resource to an individual broadcast service for use by the second radio network control entity in broadcasting data traffic. The at least one physical resource may comprise at least one from a group of: timeslot allocation, scrambling code, channelization code.

In one optional embodiment of the invention, the network element may employ a relaxed synchronisation mechanism with the communication cells, such that a transfer delay may be accommodated within the broadcast data traffic sent to the number of wireless base stations that may enable the same broadcast data to be broadcast using the same physical resource.

In one optional embodiment of the invention, the communication system may comprise a Multicast Broadcast over a Single Frequency Network (MBSFN), such that the network element may transmit the same signal using the same physical resources to a number of wireless base stations operably coupled to the second radio network control entity.

According to a second aspect of the invention, there is provided a method of providing multimedia broadcast multicast services (MBMS) over a communication system that comprises a broadcast multicast service centre (BM-SC). The method comprises allocating broadcast control plane traffic to at least one first radio network control entity dedicated to handle control plane traffic; and allocating broadcast data plane traffic to at least one second radio network control entity dedicated to handle data plane traffic.

According to a third aspect of the invention, there is provided a radio network control entity providing multimedia broadcast multicast services (MBMS) over a communication system, wherein the radio network control entity is configured to support only one from a group of: broadcast control plane traffic and broadcast data plane traffic.

According to a fourth aspect of the invention, there is provided a communication system for supporting multimedia broadcast multicast services (MBMS), wherein the communication system comprises a broadcast multicast service centre (BM-SC) and a network element comprising logic for allocating broadcast control plane traffic to at least one first radio network control entity dedicated to handle control plane traffic and allocating broadcast data plane traffic to at least one second radio network control entity dedicated to handle data plane traffic.

According to a fifth aspect of the invention, there is provided a computer program product comprising executable program code for supporting multimedia broadcast multicast services (MBMS). The computer program product comprises program code for allocating broadcast control plane traffic to at least one first radio network control entity dedicated to handle control plane traffic; and allocating broadcast data plane traffic to at least one second radio network control entity dedicated to handle data plane traffic.

According to a sixth aspect of the invention, there is provided an integrated circuit configured to support multimedia broadcast multicast services (MBMS) over a communication system. The integrated circuit comprises logic for allocating broadcast control plane traffic to at least one first radio network control entity dedicated to handle control plane traffic; and logic for allocating broadcast data plane traffic to at least one second radio network control entity dedicated to handle data plane traffic.

These and other aspects, features and advantages of the invention will be apparent from, and elucidated with reference to, the embodiments described hereinafter.

BRIEF DESCRIPTION OF THE DRAWINGS

Embodiments of the invention will now be described, by way of example only, with reference to the accompanying drawing(s), in which.

DESCRIPTION OF EMBODIMENTS OF THE INVENTION

One known aspect of MBMS is a network that is configured to operate in broadcast-only mode for Multicast/Broadcast over a Single Frequency Network (MBSFN). MBSFN provides a spectrally more efficient delivery of broadcast services over a cellular network than a telecommunication network supporting MBMS. In MBSFN, Broadcast services are transmitted simultaneously using identical physical resources, by either all cells in the network or by clusters of cells in close proximity to each other. In an MBSFN system, cells involved in the broadcast of a service will effectively be transmitting the same signal/waveform allowing for efficient combination of the received signal from multiple cells.

Mobile TV is an example of a service that may be provided over MBMS. Mobile TV is a service provided to subscribers via mobile telecommunications networks, thereby providing television services to mobile devices. From the perspective of a mobile terminal, such as a 3rd generation user equipment (UE), receiving broadcast signals transmitted from multiple cells is identical to receiving signals transmitted from a single cell with different propagation delays.

Figure 1:
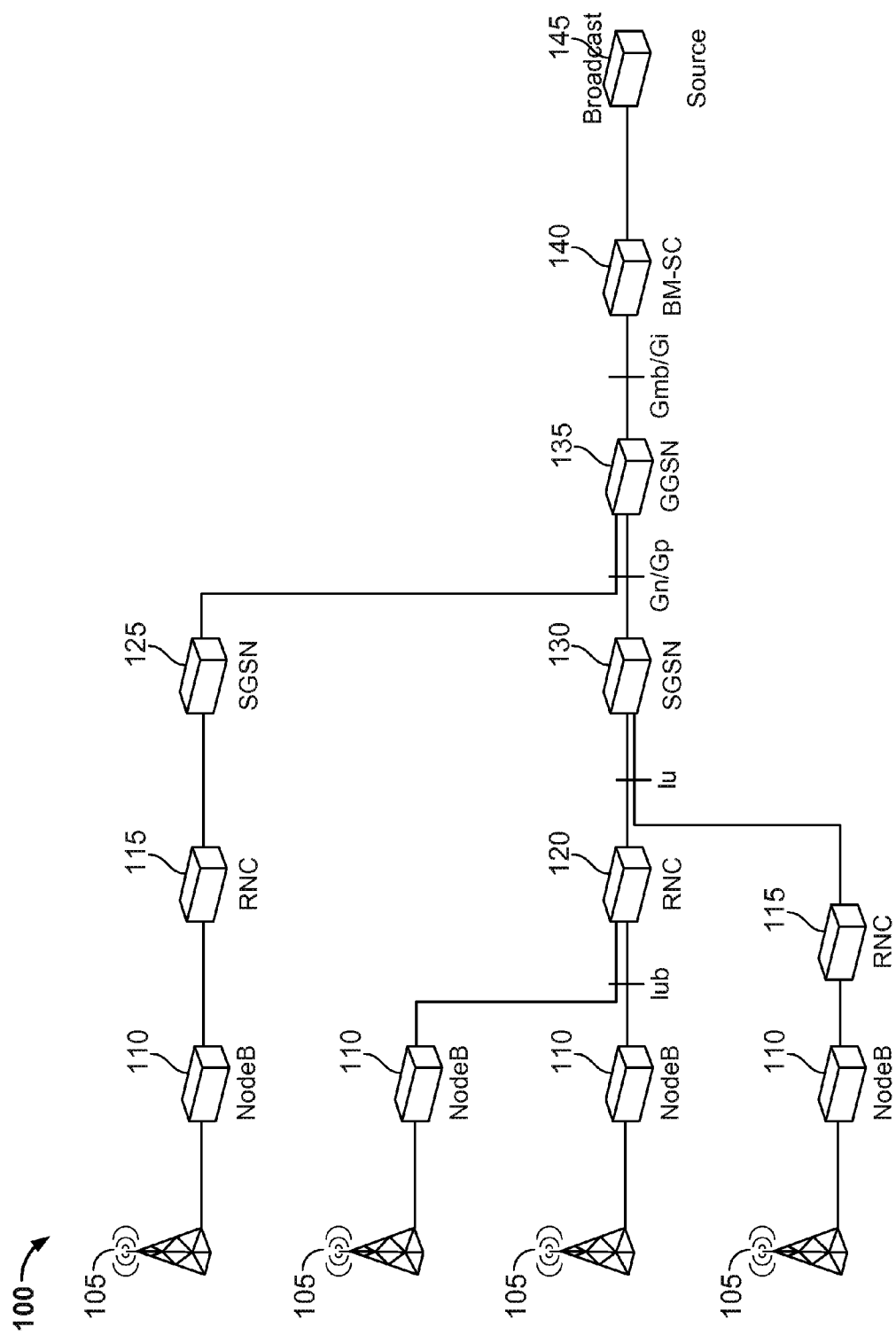
FIG. 1 illustrates an example of a known architecture for providing multimedia broadcast multicast services (MBMS).

FIG. 1 illustrates an example of a known architecture 100 for providing MBMS in a shared network basis. The architecture 100 comprises an operator network, such as a GPRS, UMTS and EPS network. The operator network comprises a communication node 110, such as a base station (referred to as a NodeB in 3GPP parlance), which is wirelessly coupled to one or more user equipment (UE) devices (not shown), such as, by way of example, a mobile telephone handset, via a number of antenna sites 105. The operator network further comprises a number of Radio Network Controllers (RNCs) 115, 120. As illustrated, a single RNC 115 can be operably coupled to a single Node B 110, or a single RNC 120 can be operably coupled to multiple Node Bs 110. RNCs 115, 120 configure the physical resources of the individual Node Bs 110 for the multimedia services and provide the data to the Node Bs 110 ready for transmission.

Additionally, each RNC 115, 120 is operably coupled to a service gateway support node (SGSN) 125, 130. As illustrated, a single SGSN 125 can be operably coupled to a single RNC 115, or a single SGSN 130 can be operably coupled to multiple RNCs 115, 120. The SGSNs 125, 130 allocate the necessary resources within the RNCs 115, 120 that are responsible for individual cells (NodeBs 110). The SGSNs 125, 130 forward the multimedia data streams for the services to the RNCs 115, 120.

A Gateway GPRS Support Node (GGSN) 135 is operably coupled to multiple SGSNs 125, 130, as illustrated. The GGSN 135 is operably coupled to a Broadcast Multicast Service Centre (BM-SC) 140, which in turn is operably coupled to a shared MBMS network comprising at least one source of broadcast media 145. The GGSN 135 identifies the necessary paths for data to be routed to subscribing mobile stations (UEs), as well as reserving the necessary resources through the SGSNs 125, 130. The GGSN 135 also provides the SGSNs 125, 130 with the multimedia data for the requested service(s) as received from the BM-SC 140. The BM-SC 140 handles the announced services and allocates resources in the MBMS network through the GGSN 135. Multimedia data for the services provided is forwarded to the GGSN 135 as packetized data, for example using internet protocol (IP) multicast techniques.

In this manner, services are announced by, and data for services are provided by, the broadcast media source 145 (sometimes referred to as a content provider). The MBMS network may be utilised for the provision of, for example, Mobile TV by more than one operator to the UEs by way of broadcasting/multicasting content streams.

The following embodiments of the invention will be described in the context of a Multimedia Broadcast Multicast Service (MBMS), as defined in 3GPP TS 22.146, 3GPP TS 23.246 and 3GPP TS 26.346. However, it will be appreciated by a skilled artisan that the inventive concept described herein may be applied to alternative comparable multimedia services.

In accordance with embodiments of the invention, apparatus and a method for supporting multimedia broadcast multicast services (MBMS) over a communication system are described. In particular, a Broadcast Integrated Network Controller (BINC) is arranged to implement RNC functionality for all cells of the network in its entirety.

Figure 2:
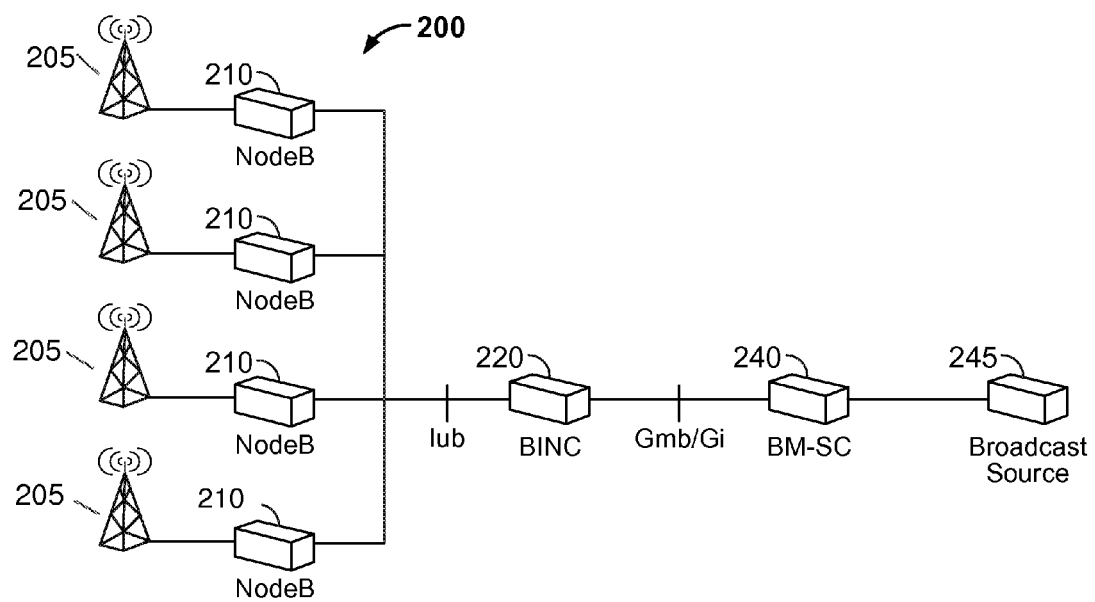
FIG. 2 illustrates an example of a MBMS system adapted according to embodiments of the invention.

Referring now to FIG. 2, an exemplary system configuration 200 according to embodiments of the invention is illustrated. The exemplary system configuration 200 is described with respect to a UMTS Terrestrial Radio Access (UTRA) time division duplex (TDD) system. An operator network comprises a plurality of communication nodes 210, such as a base station (referred to as a NodeB in 3GPP parlance), which is wirelessly coupled to one or more user equipment (UE) devices (not shown), such as, by way of example, a mobile telephone handset, via a number of associated antenna sites 205. The operator network further comprises a network element, for example in a form of a broadcast integrated network controller (BINC) 220 adapted according to embodiments of the invention. The single BINC 220 comprises logic and functionality associated with current Radio Network Controller (RNC) elements, service gateway support node (SGSN) elements and Gateway GPRS Support Node (GGSN) elements.

The BINC 220 is operably coupled to a Broadcast Multicast Service Centre (BM-SC) 240, which in turn is operably coupled to a shared MBMS network comprising at least one source of broadcast media 245. In other embodiments of the invention, the functionality of the BINC 220 and the BM-SC 240 may be co-located in the same network entity, for example a broadcast server. In accordance with embodiments of the invention, the BINC 220 identifies the necessary paths for data to subscribing mobile stations (UEs), as well as reserving the necessary resources to be used to route the multimedia data, for the requested service(s) as received from the BM-SC 240.

Figure 3:
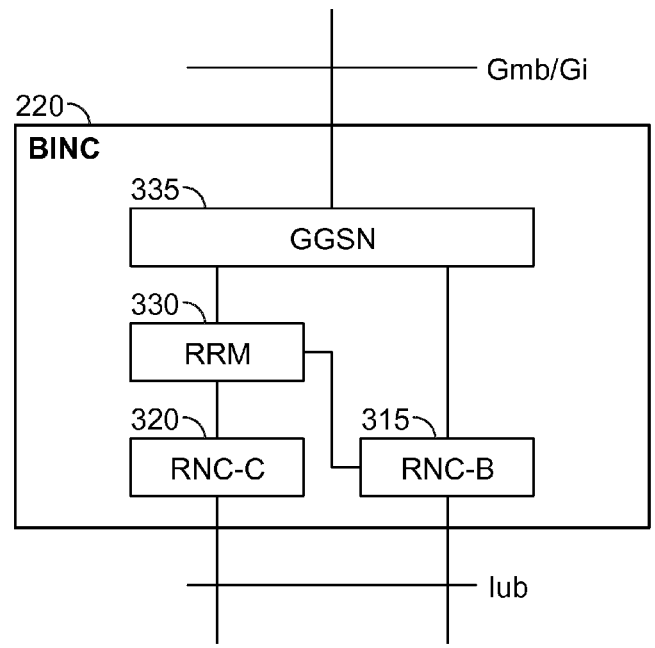
FIG. 3 illustrates an exemplary configuration of a broadcast integrated network controller adapted according to embodiments of the invention.

Referring now to FIG. 3, a Broadcast Integrated Network Controller (BINC) 220 adapted according to embodiments of the invention is illustrated. The BINC 220 comprises radio network control logic that has been divided into two distinct functional operations, namely to respectively and independently support control plane and data plane traffic. In separating the logical and functional operations in this manner, in a broadcast scenario, a more efficient use of processing resources may be achieved, with lower requirements for bandwidth in the transport network. Thus, it will be appreciated that the control plane signalling takes up significantly less bandwidth than the traffic transmitted on the user plane. Therefore, the connection from the control plane RNC to the NodeBs can be of significant less bandwidth than the user plane connection to the NodeBs carrying broadcast/multicast data. This methodology is in contrast to today's RNC configurations, which control and route both data and control traffic in the same manner, as the data and control traffic are closely related.

In accordance with embodiments of the invention, the BINC 220 is configured such that each individual cell communication is controlled by RNC control logic (RNC-C) 320 that is logically and functionally separate from the RNC data logic (RNC-B) 315. The BINC 220 comprises one or multiple RNC-Cs 320, with a single RNC-C 320 shown in FIG. 3 for simplicity purposes only. Respective NodeBs (or carriers of respective NodeBs) can be connected to one and only one RNC-C 320. Note that this single RNC-B configuration is not shown in FIG. 6.

In one embodiment of the invention, the RNC-C 320 is arranged to control all the cells of exactly one cluster, by configuring all the cells of the cluster to use identical physical resources for any service that is to be broadcast by the cells of the cluster. Thus, in one embodiment of the invention, the RNC-C 320 may use a point-to-point protocol for transport of control signaling to any Node B supporting communication within the cluster (e.g. stream control transmission protocol/Internet Protocol (SCTP/IP)).

In accordance with embodiments of the invention, each individual broadcast service, within substantially the entire network, is handled by a single RNC broadcast function (RNC-B) 315. Thus, the RNC-B 315 is responsible for the encoding of data for transmission by the cells of the network, these cells being all cells of one or more clusters.

In embodiments of the invention, the single RNC-B 315 uses a multicast protocol to forward the data to the cells (or clusters of cells) involved in the broadcast transmission, for example using a multicast protocol, such as user datagram protocol/Internet protocol (UDP/IP)).

In embodiments of the invention, Radio Resource Management (RRM) logic 330 is provided and operably coupled to the RNC-B 315 and at least one RNC-C 320. The RRM logic 330 is arranged to be responsible for the allocation of services to cell clusters, as well as for the configuration of RNC-Cs 320 and single RNC-B 315. In this regard, it is useful to correlate the IP multicast stream to specific allocation of radio resources, for example to make sure that when radio resources are set up that the source of the data (for example the IP multicast stream carrying the FP protocol) is set up at the same time.

For example, the RRM logic 330 may configure the broadcast of data in the single RNC-B 315 and link the configuration to particular cell clusters using the services set up in the RNC-B 315 to the relevant respective RNC-Cs 320.

In accordance with embodiments of the invention, the BINC 220 further comprises GGSN logic 335, operably coupled to the RRM logic 330 and arranged, inter alia, to terminate the interface to the BM-SC, for example BM-SC 240 in FIG. 2. Additionally, GGSN logic 335 is arranged to interface to RRM logic 330 in order to control and allocate usage of available resources to the single RNC-B 315 for each active service supported.

Advantageously, by employing a BINC 220 as herein described, there is no need for the MBMS system to support separate functionality of an SGSN, since the RRM logic 330 together with the RNC-Cs logic 320 and RNC-B logic 315 operations are able to manage the resource reservation and allocation of functions.

Figure 4A:
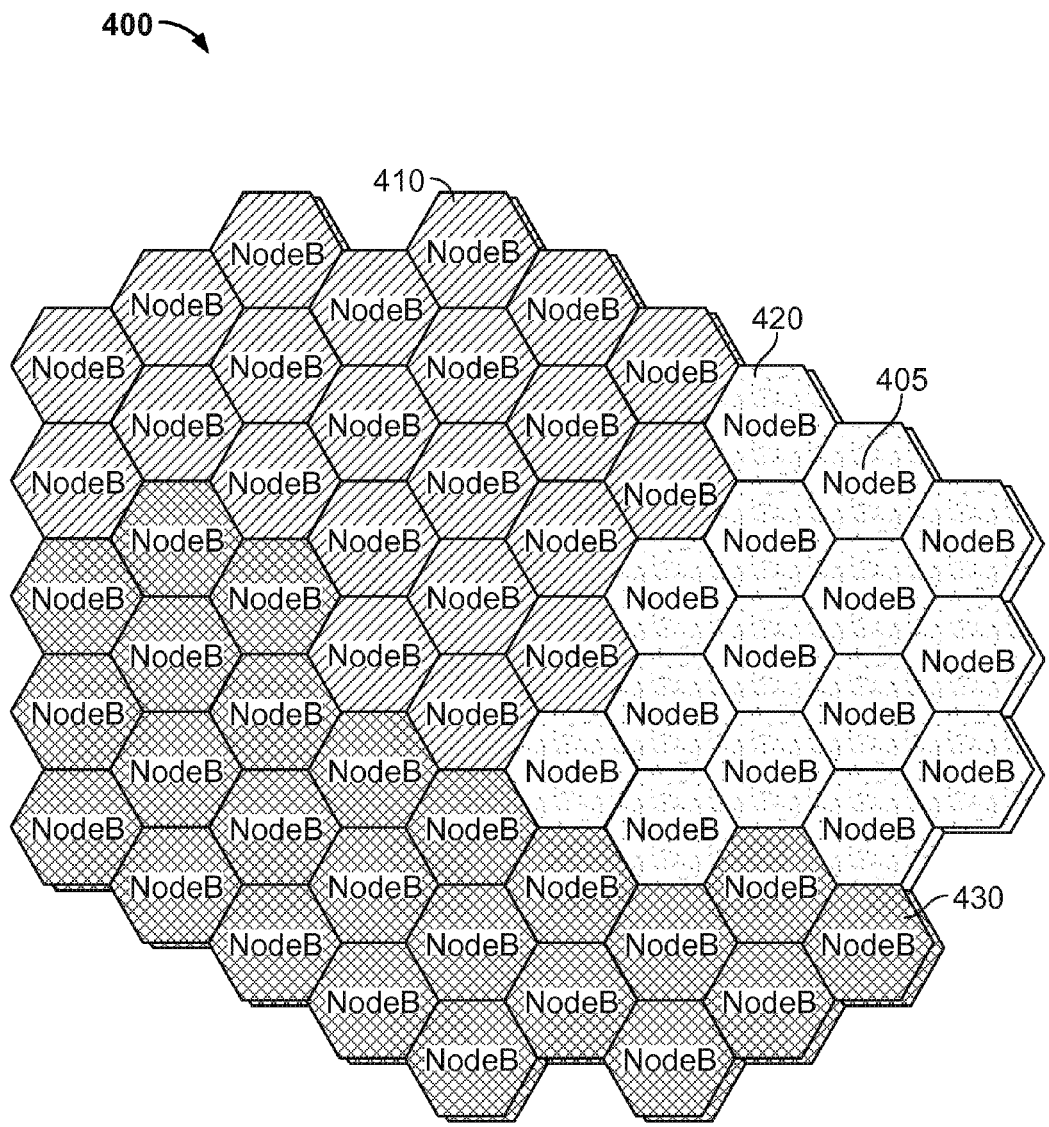
FIGS. 4A and 4B illustrate a cell-based communication system for providing broadcast and/or multicast content according to embodiments of the invention.
Figure 4B:
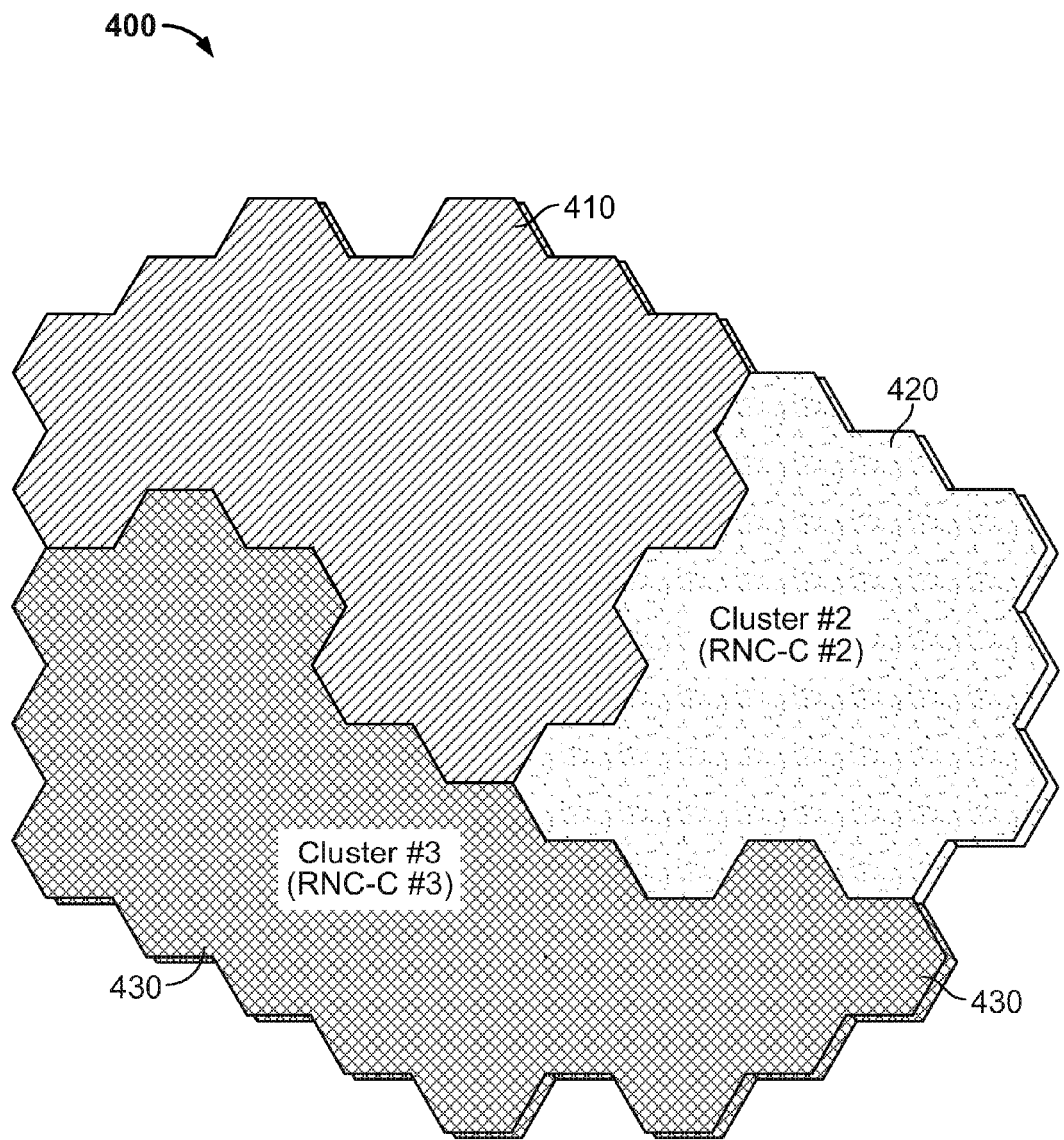

Referring now to FIGS. 4A and 4B, there is illustrated an exemplary communication system 400 for supporting broadcast and/or multicast content according to embodiments of the invention. For example, the exemplary communication system 400 may be a time division code division multiple access (TD-CDMA) based cellular system, such as a UMTS Terrestrial Radio Access time division duplex (UTRA-TDD) system. The exemplary communication system 400 comprises a multitude of communication cells with communications supported therein by respective Node Bs 405. In accordance with one embodiment of the invention, multiple cells with respective Node Bs are grouped together in a number of clusters 410, 420, 430. In the example shown in FIGS. 4A and 4B, three clusters are defined to which services can be mapped by radio resource management (RRM) logic. Each cluster has been arranged to have an adapted RNC, termed an RNC-C, which is arranged to handle control plane traffic for each of the cell configurations in a communication cell cluster.

In such an exemplary communication system 400 broadcast transmissions may be allocated by the RRM logic for each service started by, say, the BM-SC through respective RNC-Cs. In this manner, one or more physical resource(s) (for example identified by a particular timeslot (as illustrated in FIG. 5), scrambling code and/or channelization code, etc.) is/are allocated on the cells of the network.

Figure 5:
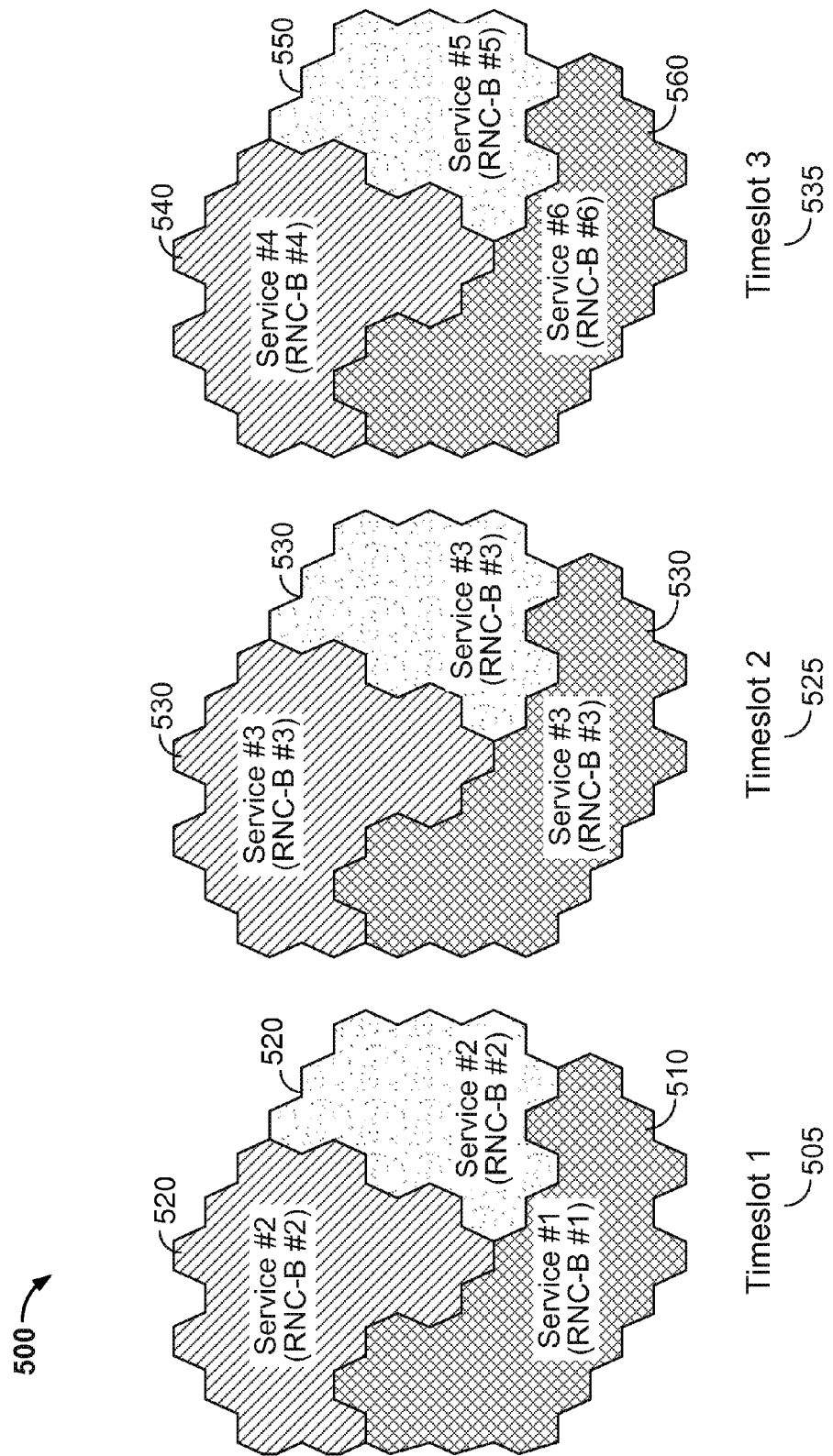
FIG. 5 illustrates an exemplary embodiment of the communication system of FIGS. 4A and 4B.

Referring now to FIG. 5, an exemplary implementation in a UMTS Terrestrial Radio Access time division duplex (UTRA-TDD) system 500 is shown, where the physical resource managed by RRM logic is in a timeslot allocation format. In this embodiment, the RRM logic allocates a carrier frequency to one or more clusters of cells, together with a designation of other parameters for the physical resource (scrambling code, channelization code, etc.). The cells of the network are controlled by an RNC-C for each defined cluster.

In the embodiment shown in FIG. 5, the UTRA-TDD system 500 comprises multiple cells with respective Node Bs 405 being grouped together in a number of clusters. In the example shown in FIG. 5 a total of six services are broadcast over three timeslots 505, 525, 535 on the clusters defined in FIGS. 4A and 4B. For example, the same cluster of cells are allocated different services, with services #1 510 and #2 520 allocated on a first timeslot 505, service #3 530 allocated to all three clusters shown on a second timeslot 525 and services #4-#6 540, 550, 560 allocated on a third timeslot 535. In this embodiment, the physical resource is allocated by the radio resource management (RRM) logic of the exemplary communication system 500 for all cells of all clusters in which the broadcast is to exist. Since the allocation in this embodiment is performed on a per timeslot basis, this leads to the possibility of a different broadcast area layout for each timeslot, thereby advantageously enabling services to be local, regional or global broadcasts.

Thus, as there are separate RNC-Bs for each of the services supported, as well as separate RNC-Cs used to control each respective cluster of cells, management of large networks may be easily achieved by using a mapping from a service to a specific cell, as illustrated in the example of Table 1.

TABLE 1

Tabular expression of the example from FIGS. 4A, 4B, and 5.

| Service | Cluster | Cell | Timeslot |
|---|---|---|---|
| 1 | 3 | 37-60 | 1 |
| 2 | 1 | 0-21 | 1 |
|  | 2 | 22-36 |  |
| 3 | 1 | 0-21 | 2 |
|  | 2 | 22-36 |  |
|  | 3 | 37-60 |  |
| 4 | 1 | 0-21 | 3 |
| 5 | 2 | 22-36 | 3 |
| 6 | 3 | 37-60 | 3 |

Figure 6:
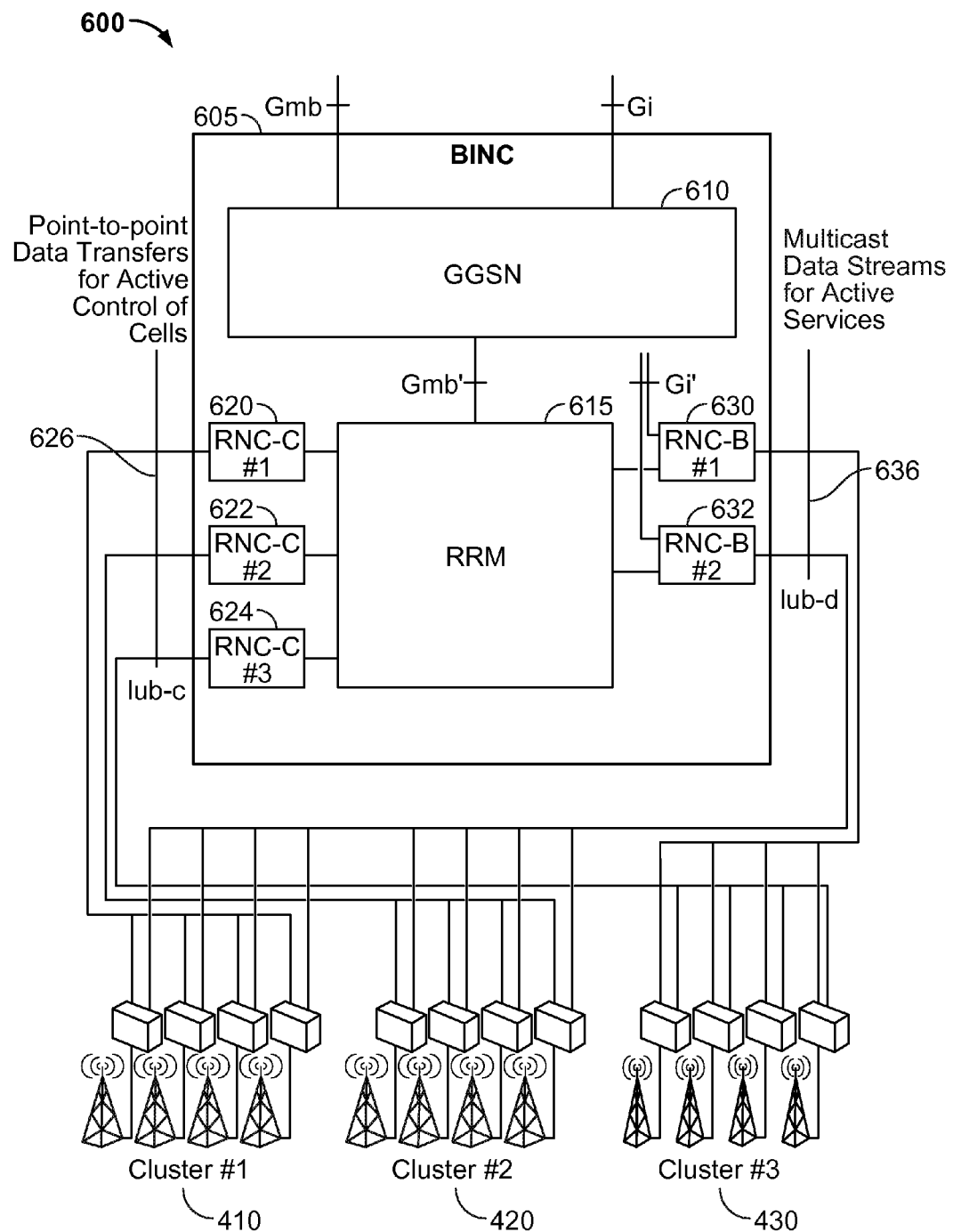
FIG. 6 illustrates an example of a broadcast integrated network controller adapted to support the provision of an MBMS service according to embodiments of the invention.

An exemplary configuration 600 including the RRM logic, adapted according to embodiments of the invention, is illustrated in FIG. 6. Whereas FIG. 3 illustrates a creation of separate control and user planes for the RNC function, FIG. 6 explains the instantiation of RNC entities to control multiple clusters, multiple services. A broadcast integrated network controller (BINC) 605 comprises a GGSN 610 operably coupled to the RRM logic 615. The RRM logic 615 comprises processing logic (not shown) operably coupled to RNC-broadcast network entities (RNC-Bs) 630, 632 arranged to handle multicast data streams for active services 636 routed via the Iub-d interface. The RRM logic 615 also comprises processing logic (not shown) operably coupled to RNC-control network entities (RNC-Cs) 620, 622, 624 arranged to handle point-to-point (unicast) data transfers for active control of cells 626 routed via the Iub-c interface.

In accordance with one embodiment of the invention, the RRM logic 615 directs each RNC-C 620, 622, 624 to control configuration of a respective cluster of cells for the broadcast communication. As shown in FIG. 6 (based for example on the timeslot allocation shown in FIG. 5), the data plane associated with each service is handled by its own RNC-B 630, 632 entity and the cells of one or more clusters will broadcast the data, depending on the allocations performed by RRM 615 through the RNC-C entities 620 622, 624.

In one embodiment of the invention, this control uses the 3GPP NBAP protocol over the Iub, for example the Iub-c interface 626.

All cells in FIG. 6 that are sending a specific service are connected to one, and only one, RNC-B. Additionally, in one embodiment, the RRM logic 615 directs each RNC-B 630, 632 to generate data for the broadcast for all the cells using the 3GPP framing protocol (FP) and forward this data to the cells over the Iub-d interface 636 as multicast data streams. In this embodiment, the broadcast multicast data streams may use internet protocol (IP) multicast. In this embodiment, a relaxed synchronisation mechanism that allows the BINC 605 to be loosely synchronised to the cells of the network may be implemented based on the FP synchronisation mechanism.

Thus, as there is no longer a requirement for the BINC 605 to be synchronized with each cell in the usual 'rigid' manner, the delay allowed for the Iub-d transmission may be relaxed to a delay large enough for all cells carrying a particular service to be able to transmit the same data at the same time, as per the principle of a MBSFN. This scenario applies when the same physical resource is allocated in all cells and a sufficient transfer delay over the Iub is allowed for. In this embodiment, the essence of the delay is to make sure that all cells send the same data at the same time, thereby ensuring that the data is available at all cells at that time. A skilled artisan will appreciate that in a data network, with that two way communication, it is important to keep delays to a minimum, which is not the case in the exemplary embodiments of a broadcast, downlink-only, network.

In accordance with embodiments of the invention, each cell of a cluster, for example in an MBSFN communication system that is participating in the broadcast sessions started by the BM-SC is arranged by RRM logic 615 to transmit the same signal using the same physical resources. Each cell is arranged to have the exact same configuration of the physical resources in use, within the cluster that a specific RNC-C controls. In this manner, each RNC-B 630, 632 configures the cells under its control in an identical manner, where the cells are partitioned within the same cluster. Each RNC-B 630, 632 is arranged to provide each respective cell with the same data for transmission synchronously on separate network links to all UEs within the cluster coverage area.

As the physical resources used for the broadcast of a service are the same in all clusters involved, a UE is able to receive the signals for that service from all broadcasting cells, as if the broadcast signal was received from one cell with different propagation delays. This in turn allows for efficient combination of the received signals, leading to an improved signal-to-noise ratio.

As will be appreciated, separation of the RNC functions into separate control plane (RNC-C) and broadcast data pane (RNC-B) parts for respective cells allows for more efficient processing in the network element handling the RNC functionality. Furthermore, by controlling all cells of a cluster from the same RNC-C 620, 622, 624, the process of ensuring identical configuration of the cells is greatly simplified. Similarly, by controlling all cells of the MBSFN communication system from the same network element, namely the RRM logic 615, management of the network layout (for example assignment of cells to clusters, definition of service areas, etc.) becomes simpler.

Thus, the architecture provided in embodiments of the invention facilitates a significant reduction in the system's computation requirements as there is no longer a need for an instantiated RNC per cell. Consequently, there is no need to support separate streams for each NodeB. Accordingly, it is possible to have only one network element handling the MBMS GGSN/SGNS/RNC function of an entire network.

Furthermore, the provision of data for transmission of a service from the same RNC-B to all cells, using for example a multicast transport protocol, results in a greatly reduced processing load on the network element that performs the RNC function. Thus, SGSN/GGSN functionality may be reduced to routing of IP multicast streams from the Gi interface to similar FP-based IP multicast streams on an Iub-d interface via a single RNC-B per service.

In addition, the amount of traffic that must be routed through the transport network at the RNC-NodeB end is reduced. As the FP protocol is no longer implemented in a point-to-point manner on a per cell basis, whereas the NodeB Access Protocol is, the FP protocol is now based on IP multicast. Therefore, the FP transmission may also be broadcast, and irrespective of how many cells need to receive a service, there is only one instance of the data broadcast via IP multicast to all cells, not one instance per cell.

Additionally, the separation of the data plane using a multicast transport protocol allows for alternative routing of the data plane traffic, separately from the control plane unicast traffic, to the cells of the system. This allows for a limited bandwidth unicast link to cell sites while the majority of the bandwidth used for traffic can be realised in a different way, for example through a dedicated broadcast satellite link.

Although the embodiments described herein are directed to a 3GPP communication system, the embodiments may be applied to any other cellular network operating as an MBSFN (or operating in an MBSFN like manner), for example a WiMAX system.

As will be appreciated by a skilled artisan, only those logical/functional components necessary for describing the inventive concept are illustrated herein, and accordingly the BINC, including RRM logic, RNC logic, etc. may comprise further logical/functional components (not shown).

It will be understood that the method and apparatus for supporting multimedia broadcast multicast services, as described above may provide, by way of example only, at least one of the following advantages:

(i) The RRM logic in the broadcast integrated network controller may be able to identify the necessary paths for sending broadcast data to subscribing mobile stations (UEs), as well as being able to reserve the necessary resources to be used to route the broadcast multimedia data.

(ii) In separating the logical and functional operations between distinct radio network controller entities, by transmitting data plane using a multicast transport protocol and control plane unicast traffic, the embodiments described allow for alternative and separate routing of the traffic in a broadcast scenario. This allows a more efficient use of processing resources, with lower requirements for bandwidth in the transport network.

(iii) The RRM logic is arranged to be responsible for the allocation of services, with a single RNC-B per service, to cell clusters as well as for the configuration of RNC-Cs, thereby removing a need for a separate SGSN entity.

(iv) By controlling all cells of a cluster from the same RNC-C, the process of ensuring identical configuration of the cells is greatly simplified.

(v) By controlling all cells of, say, an MBSFN communication system from the same network element, for example the RRM logic, management of the network layout (for example assignment of cells to clusters, definition of service areas, etc.) becomes simpler.

(vi) An embodiment that allocates services on a per timeslot basis provides for the possibility of a different broadcast area layout for each timeslot, thereby advantageously enabling services to be local, regional or global broadcasts. Further embodiments allocate several services per timeslot, where all services multiplexed to a time-slot are mapped to the same clusters, for example the geographical area of all the services within a single time-slot are the same.

(vii) If the 3GPP framing protocol (FP) is used to forward the broadcast data to the cells over the Iub-d interface as multicast data streams, a relaxed synchronisation mechanism may be used to allow the broadcast integrated network controller to be loosely synchronised to the cells of the network.

(viii) The provision of data for transmission of a service from the same RNC-B to all cells, using for example a multicast transport protocol, results in a greatly reduced processing load on the network element that performs the RNC function. In addition, the amount of traffic that must be routed through the transport network at the RNC-NodeB end is reduced.

While the invention has been described in terms of particular embodiments and illustrative figures, those of ordinary skill in the art will recognize that the invention is not limited to the embodiments or figures described. Although embodiments of the present invention are described, in some instances, using UMTS terminology, those skilled in the art will recognize that such terms are also used in a generic sense herein, and that the present invention is not limited to such systems.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term 'logic' herein refers to fixed hardware, programmable logic and/or an appropriate combination thereof, as would be recognized by one skilled in the art to carry out the recited functions.) Additionally, the term 'broadcast' in the Claims is intended as encompassing any combination of broadcast and/or multicast communications, for example over a communication system that comprises a broadcast/multicast media server. Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 7:
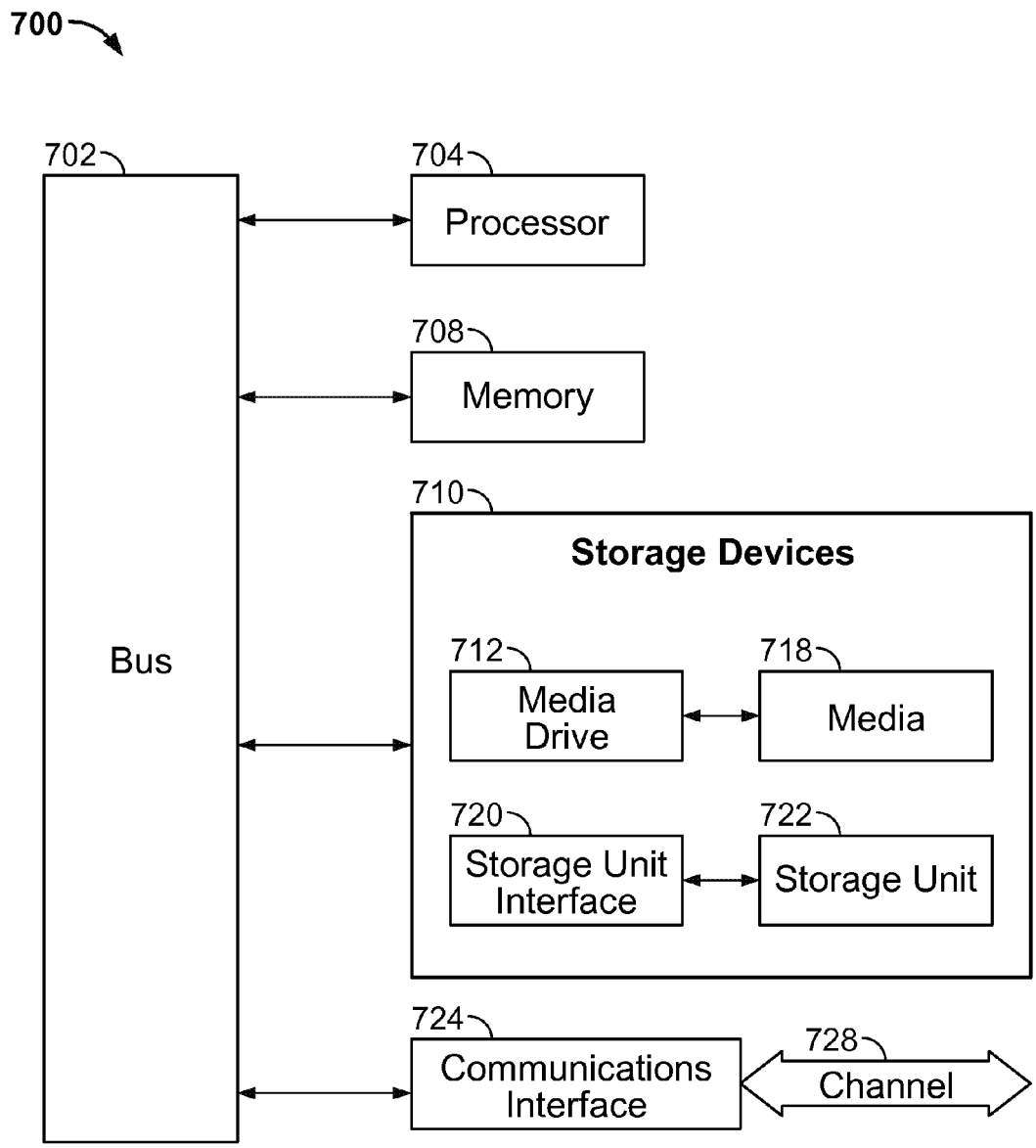
FIG. 7 illustrates a typical computing system that may be employed to implement processing functionality in embodiments of the invention.

FIG. 7 illustrates a typical computing system 700 that may be employed to implement processing functionality in embodiments of the invention. Computing systems of this type may be used in the Broadcast Integrated Network Controller (in particular, the RRM logic and RNC logic of the BINC), for example. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communication medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 712. As these examples illustrate, the storage media 718 may include a computer-readable storage medium having stored therein particular computer software or data.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a universal serial bus (USB) port), a PCMCIA slot and card, etc. Software and data transferred via communications interface 724 are in the form of signals which can be electronic, electromagnetic, optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, storage unit interface 720, media drive 712 or communications interface 724. The control logic (in this example, software instructions or computer program code), when executed by the processor 704, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Although the invention has been described in connection with embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

We claim:

1. A network element supporting multimedia broadcast multicast communication over a communication network, the network element comprising:
   a processor configured:
   to receive a multimedia broadcast from a broadcast multicast media server to allocate broadcast control plane traffic for each of a plurality of communication cell clusters to one of a plurality of control plane radio network control entities, wherein each of the plurality of control radio network control entities is dedicated to handle control plane traffic for a respective communication cell cluster, and
   to allocate broadcast data plane traffic for the received multimedia broadcast to a broadcast radio network control entity dedicated to handle data plane traffic for the multimedia broadcast; and
   wherein each communication cell cluster comprises one or more individual communication cells.

2. The network element of claim 1, wherein the plurality of control plane radio network control entities are configured to use a point-to-point protocol for transport of control signaling to the one or more individual communication cells.

3. The network element of claim 2, wherein the plurality of control plane radio network control entities are configured to use the point-to-point protocol by using a stream control transmission protocol/Internet Protocol (SCTP/IP).

4. The network element of claim 1, wherein the processor is further configured:
   to receive a plurality of multimedia broadcasts from the broadcast multicast media server;
   to allocate broadcast data plane traffic for each of the plurality of received multimedia broadcasts to one of a plurality of broadcast radio network control entities dedicated to handle data plane traffic for a respective multimedia broadcast; and wherein
   each individual broadcast service for a respective cluster of cells is supported by one of the plurality of, broadcast radio network control entities.

5. The network element of claim 4, wherein the processor is further configured to allocate at least one physical resource for the received multimedia broadcast for use by the one of the plurality of broadcast radio network control entities in broadcasting data traffic, wherein the at least one physical resource comprises at least one of a timeslot allocation, a scrambling code, or a channelization code.

6. The network element of claim 4, wherein the at least one of the plurality of broadcast radio network control entities is configured to use a multicast protocol for transport of broadcast data traffic to a number of wireless base stations operably coupled to one of the plurality of broadcast radio network control entities.

7. The network element of claim 6, wherein the at least one of the plurality of broadcast radio network control entities is configured to use the multicast protocol by using a user datagram protocol/Internet protocol (UDP/IP).

8. The network element of claim 6, wherein the network element is further configured to perform a relaxed synchronisation with the one or more individual communication cells such that a transfer delay is accommodated within broadcast data traffic sent to the number of wireless base stations that enables a same broadcast data to be broadcast using a same physical resource.

9. The network element of claim 1, wherein the communication network is configured to support multimedia broadcasting multicasting services (MBMS) and comprises a broadcast multicast service centre (BM-SC).

10. The network element of claim 1, wherein the communication network is configured to support Multicast Broadcast over a Single Frequency Network (MBSFN) such that each of the one or more individual communication cells of one, or more of the plurality of control plane radio network control entities is configured to transmit a same signal using a same physical resources to a number of wireless base stations operably coupled to the one or more of the plurality of control plane radio network control entities.

11. The network element of claim 1, wherein the broadcast radio network control entity is configured to send the received multimedia broadcast to one or more of the plurality of communication cell clusters.

12. A method performed by network element in a communication network, the method comprising:
   receiving, by the network element, a multimedia broadcast from a broadcast multicast media server;
   allocating broadcast control plane traffic for each of a plurality of communication cell clusters to one of a plurality of control plane radio network control entities dedicated to handle control plane traffic for a corresponding communication cell cluster;
   allocating broadcast data plane traffic for the received multimedia, broadcast to a broadcast radio network control entity dedicated to handle data plane traffic for the multimedia broadcast; and
   wherein each communication cell cluster comprises one or more individual communication cells.

13. The method of claim 12, wherein the plurality of control plane radio network control entities use a point-to-point protocol for transport of control signaling to the one or more individual communication cells.

14. The method of claim 12, further comprising:
   receiving, by the network element, a plurality of multimedia broadcasts from the broadcast multicast media server;
   allocating, by the network element, broadcast data plane traffic for each of the plurality of received multimedia broadcasts to one of a plurality of broadcast radio network control entities dedicated to handle data plane traffic for a respective multimedia broadcast; and
   wherein each individual broadcast service for a respective cluster of cells is supported by one of the plurality of broadcast radio network control entities.

15. The method of claim 12, wherein the communication network supports Multicast Broadcast over a Single Frequency Network (MBSFN) such that each of the one or more individual communication cells of one or more of the plurality of control plane radio network control entities transmit a same signal using a same physical resources to a number of wireless base stations operably coupled to the one or more of the plurality of control plane radio network control entities.

16. A communication network, the communication network comprising:
- a broadcast media server; and
- a network element configured to:
  - receive a multimedia broadcast from the broadcast media server;
  - allocate broadcast control plane traffic for each of a plurality of communication cell clusters to one of a plurality of control plane radio network control entities dedicated to handle control plane traffic for a corresponding communication cell cluster;
  - allocate broadcast data plane traffic for the received multimedia broadcast to a broadcast radio network control entity dedicated to handle data plane traffic for the multimedia broadcast; and
- wherein the communication network comprises the plurality of communication cell clusters and each, communication cell cluster comprises one or more individual communication cells.

17. A communication network, the communication network comprising:
- a broadcast media server configured to broadcast media to a network element;
- the network element comprising a processor configured to:
  - receive a multimedia broadcast from the broadcast multicast media server;
  - allocate broadcast control plane traffic for each of a plurality of communication cell clusters to one of a plurality of control plane radio network control entities, wherein each of the plurality of control plane radio network control entities is dedicated to handle control plane traffic for a respective communication cell cluster; and
  - allocate broadcast data plane traffic for the received multimedia broadcast to a broadcast radio network control entity dedicated to handle data plane traffic for the multimedia broadcast, wherein the broadcast radio network control entity is configured to send the received multimedia broadcast to one or more of the plurality of communication cell clusters;
- a Node B configured to:
  - send the control plane traffic to and receive the control plane traffic from the respective one of the plurality of control plane radio network control entities,
  - send the control plane traffic to and receive the control plane traffic from a user equipment device,
  - receive the data plane traffic from the broadcast radio network control entity, and
  - send the data plane traffic to the user equipment device.

18. A method performed by a communication network, the method comprising:
- sending, by a broadcast media server, a multimedia broadcast;
- receiving, by the network element, the multimedia broadcast from the broadcast media server;
- allocating, by the network element, broadcast control plane traffic for each of a plurality of communication cell clusters to one of a plurality of control plane radio network control entities dedicated to handle control plane traffic for a corresponding communication cell cluster;
- allocating, by the network element, broadcast data plane traffic for the received multimedia broadcast to a broadcast radio network control entity dedicated to handle data plane traffic for the multimedia broadcast; and
- wherein the communication network comprises the plurality of communication cell clusters and each communication cell cluster comprises one or more individual communication cells.

* * * * *

UNITED STATES PATENT AND TRADEMARK OFFICE
CERTIFICATE OF CORRECTION

| | | |
|---|---|---|
| PATENT NO. | : 8,446,850 B2 | Page 1 of 1 |
| APPLICATION NO. | : 12/169556 | |
| DATED | : May 21, 2013 | |
| INVENTOR(S) | : Ørnbo et al. | |

It is certified that error appears in the above-identified patent and that said Letters Patent is hereby corrected as shown below:

In the Specification

In Column 2, Line 32, delete "an user" and insert -- a user --, therefor.

In Column 3, Line 57, delete "DESCRIPTION" and insert -- DETAILED DESCRIPTION --, therefor.

In Column 6, Line 19, delete "(UDP/IP))." and insert -- (UDP/IP). --, therefor.

In Column 8, Line 12, delete "620 622, 624." and insert -- 620, 622, 624. --, therefor.

In Column 11, Line 46, delete "removable storage unit 718" and insert -- removable storage unit 722 --, therefor.

In the Claims

In Column 13, Line 22, in Claim 1, delete "server" and insert -- server; --, therefor.

In Column 13, Line 26, in Claim 1, delete "control radio" and insert -- control plane radio --, therefor.

In Column 13, Line 53, in Claim 4, delete "plurality of," and insert -- plurality of --, therefor.

In Column 13, Line 64, in Claim 6, delete "to use" and insert -- to use: --, therefor.

In Column 14, Line 20, in Claim 10, delete "one," and insert -- one --, therefor.

In Column 14, Lines 38-39, in Claim 12, delete "multimedia," and insert -- multimedia --, therefor.

In Column 15, Line 17, in Claim 16, delete "each," and insert -- each --, therefor.

Signed and Sealed this
First Day of April, 2014

Michelle K. Lee
*Deputy Director of the United States Patent and Trademark Office*